United States Patent [19]

Kodosky et al.

[11] Patent Number: 5,301,301
[45] Date of Patent: Apr. 5, 1994

[54] POLYMORPHIC DATAFLOW BLOCK DIAGRAM SYSTEM AND METHOD FOR PROGRAMMING A COMPUTER

[75] Inventors: Jeffrey L. Kodosky; James J. Truchard, both of Austin, Tex.; John E. MacCrisken, Palo Alto, Calif.

[73] Assignee: National Instruments Corporation, Austin, Tex.

[21] Appl. No.: 647,785

[22] Filed: Jan. 30, 1991

[51] Int. Cl.⁵ .................... G06F 15/31; G06F 15/46
[52] U.S. Cl. .................................. 395/500; 395/159; 395/161; 364/578; 364/191; 364/DIG. 2; 364/977; 364/977.1; 364/920.2
[58] Field of Search ............... 395/159, 161, 500, 800; 364/578, 191, 192

[56] References Cited

U.S. PATENT DOCUMENTS

| | | | |
|---|---|---|---|
| 4,315,315 | 2/1982 | Kossiakoff | 395/700 |
| 4,455,619 | 6/1984 | Masui et al. | 395/160 |
| 4,656,603 | 4/1987 | Dunn | 395/1 |
| 4,663,704 | 5/1987 | Jones et al. | 364/188 |
| 4,677,587 | 6/1987 | Zemany, Jr. | 395/500 |

*Primary Examiner*—Robert B. Harrell
*Assistant Examiner*—Richard Lee Ellis
*Attorney, Agent, or Firm*—Flehr, Hohbach, Test, Albritton & Herbert

[57] ABSTRACT

A computer system is programmed by a user to perform dataflow computations by constructing a dataflow block diagram that utilizes function icons. At least a subset of the function icons are polymorphic with respect to data type and with respect to data aggregation. A polymorphic function icon is executed by performing a single mathematical operation when its inputs are scalars, while the same icon is executed on an element when its inputs are arrays or a scalar and an array. With cluster inputs, the polymorphic function icon is executed on a component by component basis. Output types of polymorphic function icons are determined by their input types prior to executing the diagram. The system automatically constructs a connection diagram consisting of an icon with connection points that are labelled with the names of associated front panel controls and indicators. A front panel control can be hidden to make the associated control value a constant. To facilitate use of icons, a two dimensional palette of user constructed icons is automatically constructed from a directory of user constructed icons. Further, the name of the virtual instrument associated with an icon is displayed whenever the mouse cursor is proximate the icon. The system also generates a hierarchy diagram in which icons are arranged such that each icon has lines connected to all the icons it uses in its block diagram. A dataflow diagram can be locked to prevent modification thereof while still allowing the dataflow diagram to be executed.

15 Claims, 28 Drawing Sheets

POLYMORPHIC DATAFLOW BLOCK DIAGRAM SYSTEM AND METHOD FOR PROGRAMMING A COMPUTER

BACKGROUND OF THE INVENTION

LabVIEW is a graphical programming system consisting of one or more "virtual instruments", each consisting of an input-output control panel, a dataflow block diagramming mechanism, and an associated icon. The block diagram specifies the connection, and hence the execution sequence (by means of dataflow rules) of an arbitrary set of built-in functions ("primitive icons") and user-specified functions ("virtual instruments"), thereby creating a hierarchical system of these virtual instruments. Refer to U.S. Pat. No. 4,901,221.

A number of significant improvements have been made which enable such a system to execute faster, use less memory, and more flexibly and compactly specify complex procedures.

SUMMARY OF THE INVENTION

A computer system is programmed by a user to perform dataflow computations by constructing a dataflow block diagram that utilizes function icons. The function icons are polymorphic with respect to data aggregation. Thus, for example, an ADD icon could operate as follows:

a. with array inputs, add element by element to produce an array output;

b. with cluster inputs, add component by component to produce a cluster output;

c. with an array and scalar number input, add the scalar number to each element of the array to produce an array output;

d. with a cluster and scalar number input, add the scalar number to each component of the cluster to produce a cluster output;

e. with an array of clusters and a cluster input, add the cluster (component by component) to each cluster element of the array to produce an output array of clusters.

The output types of all polymorphic function icons are determined by their input types and this determination is made prior to executing the diagram. Precision changes resulting from automatic conversions at the inputs to polymorphic function icons are indicated to the user.

Another aspect of the present invention is that the system automatically constructs a connection diagram consisting of an icon with labelled connection points. The labels on the connection points are the names of associated front panel controls and indicators. Furthermore, the data type of the inputs and outputs to the icon are indicated in the displayed wire pattern. Preferably, input names are shown on the left of each icon and output names are shown on the right side of each icon.

To facilitate the use of icons, a two dimensional palette of user constructed icons is automatically constructed from a directory of user constructed icons. Further, the name of the virtual instrument associated with an icon is displayed whenever the mouse cursor is near or over the icon in the palette.

Another feature of the present invention is a hierarchy diagram in which icons are arranged such that each icon has lines connected to all the icons it uses in its block diagram. Also provided is a facility for displaying all the immediate users of a given icon, and for displaying all icons that are directly used by a given icon.

Another set of features of the present invention concern the displaying of virtual front panels for controlling a dataflow computation. The present invention provides the ability to place front panel controls on a block diagram for constants, the ability to hide a front panel control so as to effectively make it a constant, and the ability to lock a dataflow diagram to prevent modification thereof while still allowing the dataflow computation represented by the diagram to execute and for the associated front panel to be operated. In addition, a dataflow diagram can be hidden form users for security reasons.

BRIEF DESCRIPTION OF THE DRAWINGS

FIG. 5b shows a representative front panel window for the connection diagram of FIG. 5a;

FIG. 6a shows a representative front panel window for the connection diagram of FIG. 5a;

FIG. 8b is an illustrative screen showing a VI showing the VI icon for the temperature system of FIG. 8a;

FIG. 11b shows an illustrative functional block diagram which shows further details of the function performed by the elements of the diagram of FIG. 11a;

Figure 1:
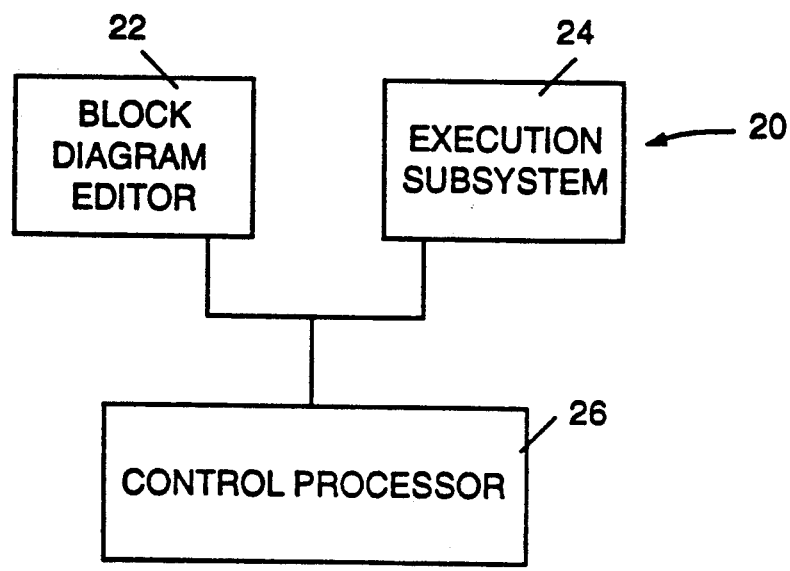
FIG. 1 is a generalized block diagram of a system which can embody the present invention.
Figure 2:
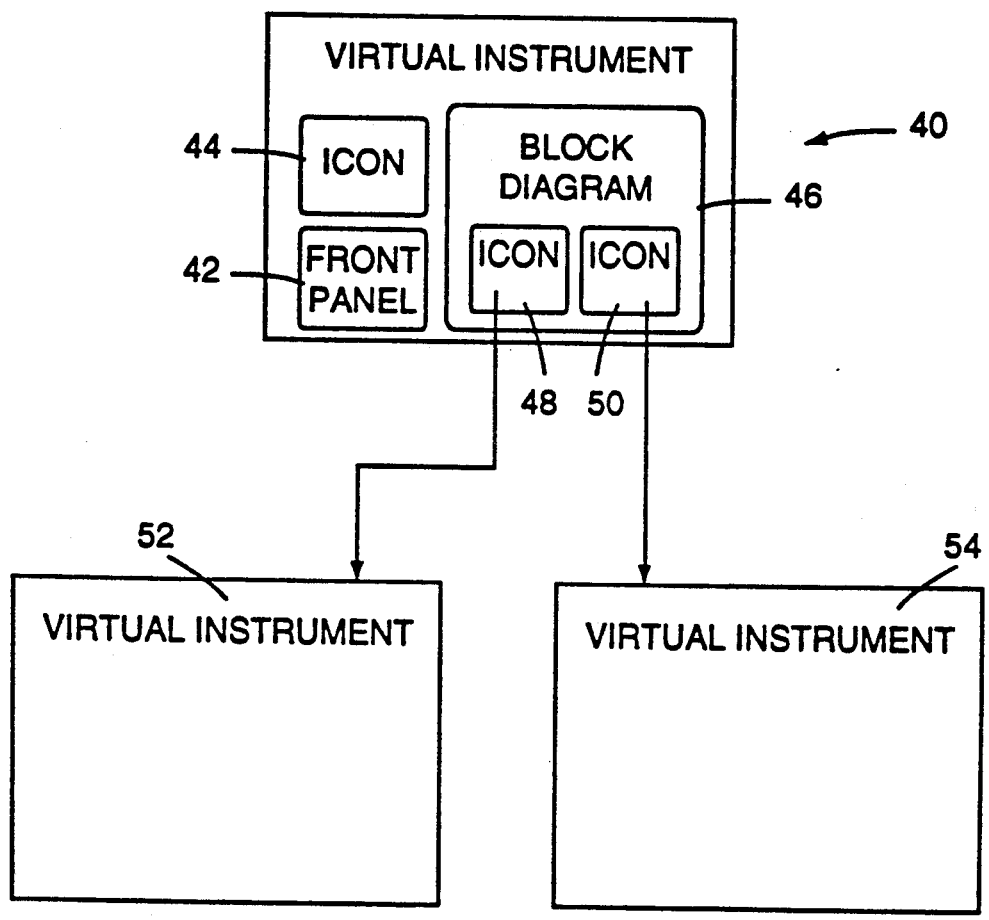
FIG. 2 is a more detailed block diagram of the system of FIG. 1 in which illustrative subcomponents of the system and their hierarchal relationships to each other are shown.
Figure 3:
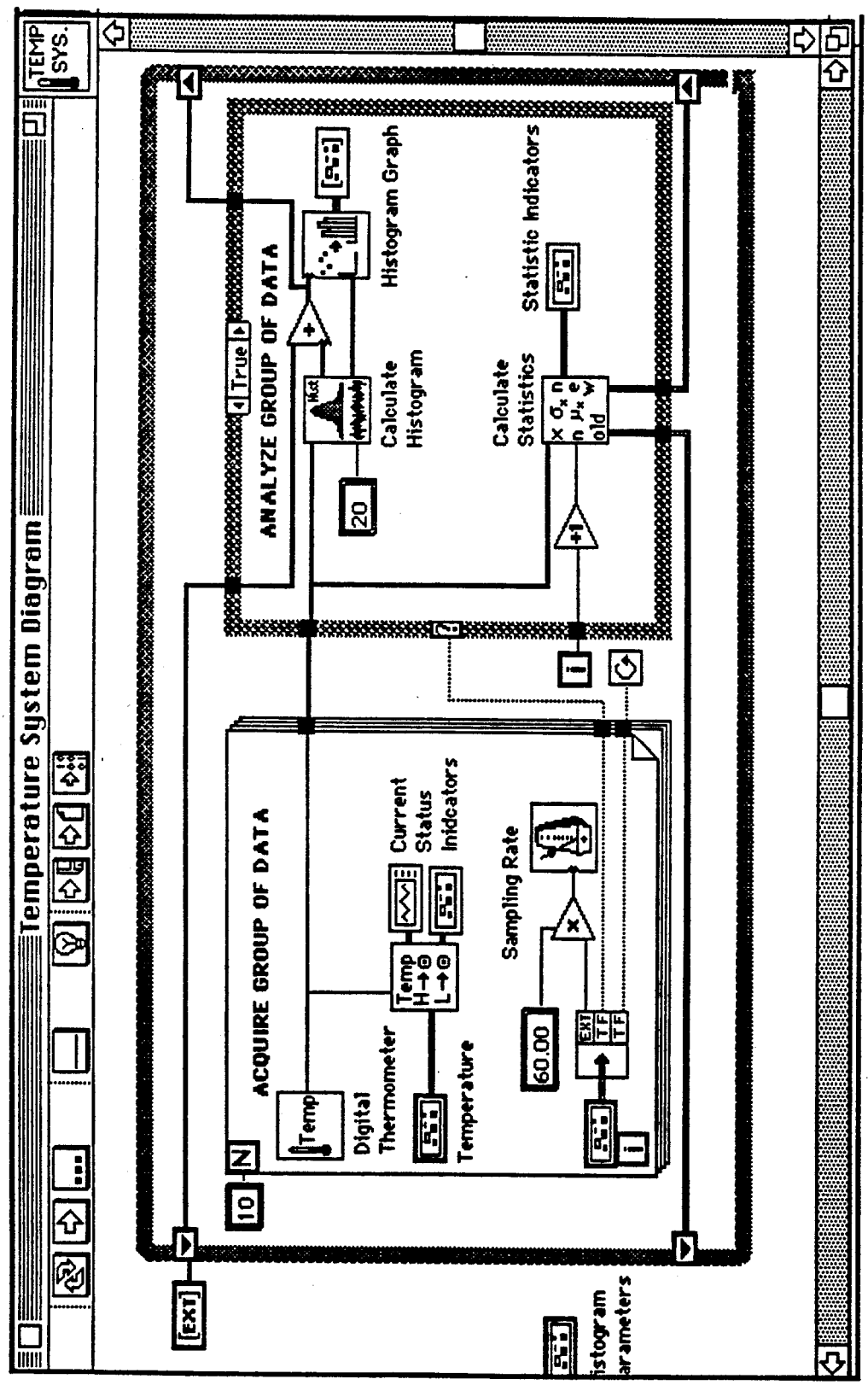
FIG. 3 is a screen display showing an exemplary data flow block diagram which can be produced by the system of FIG. 1.

Function 21 shows an illustrative block diagram screen display in accordance with the invention.

DESCRIPTION OF THE PREFERRED EMBODIMENTS

The system and method of the present invention relate to improvements in the system and method disclosed in commonly assigned U.S. Pat. No. 4,901,221, which issued Feb. 13, 1990 to Kodosky, et al. and which is expressly incorporated herein in its entirety by this reference.

The system and method of the present invention also relates to improvements in the system and method disclosed in commonly assigned U.S. Pat. No. 4,914,568 which issued Apr. 3, 1990 to Kodosky, et al. and which is expressly incorporated herein in its entirety by this reference.

POLYMORPHISM

A function is polymorphic if it can be applied to arguments of more than one type. In many computer languages it is possible to form expressions such as A+B where A and B are integers or floating point numbers. The + operator is polymorphic because it computes the proper integer or floating point result, respectively. The + operator is also said to be "overloaded" since it means both integer add and floating point add, depending on the context. LabVIEW extends this concept to the data flow programming environment, e.g., the ADD icon will accept integer or floating point inputs and compute the proper result. LabVIEW also extends the concept to apply to data aggregates, e.g., the ADD icon will accept two input arrays of numbers and produce an output array of numbers where each element of the output is the sum of the corresponding input elements, i.e., output[i]=A[i]+B[i] for each i. Some conventional text-based languages overload an operator to allow array operations such as these but they typically also require additional information (e.g., the MAT keyword in BASIC, or a "meta operator" in APL) to indicate that the operation is to be performed element by element on the array(s). LabVIEW's polymorphism extends even further in that the same ADD icon will add a scalar to each element of an array, or add a scalar to each component of a numeric cluster (a numeric cluster being a collection of heterogeneous numeric variables, analogous to a C structure of numbers or a Pascal record of numbers). Furthermore, the ADD icon will add two numeric clusters component by component, or will add a numeric cluster to an array of numeric clusters.

In conventional text-based languages conversions may be performed on inputs to polymorphic functions. For example, when computing A+B where A and B have different precision, the input of lesser precision is extended to the format of greater precision, and the ADD operation is then performed in the greater precision. LabVIEW does this automatic conversion, where necessary, in the dataflow block diagrams. It also indicates where this conversion is done so that the user is cognizant of the implications of the precision change (e.g., more memory may be required as well as more time to compute).

If the types of all function inputs and outputs are known before execution begins then the system is statically typed, otherwise it is dynamically typed. Dynamically typed systems are typically much slower than statically typed systems.

An important advantage of polymorphism is:

it allows a small number of distinct icons to perform several functions, without confusion to the user, and without ambiguity in the language.

CONNECTION DIAGRAM

Figure 5A:
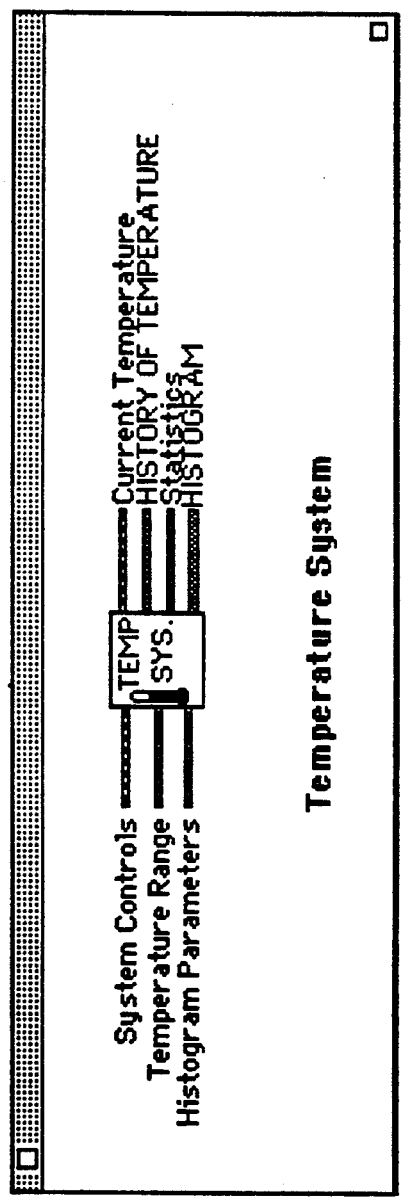
FIG. 5a shows a representative connection diagram window for an illustrative temperature system.

A LabVIEW user constructs a virtual instrument building block by defining an icon and connector for a virtual instrument (VI). In defining the connector the user associates each terminal of the connector with an indicator (output) or control (input) on the front panel of the VI (he has previously placed the controls and indicators on the panel and named them). Once the icon and connector have been constructed it is then possible to use the VI as a node in a diagram of a higher level VI. Typically the user will need to refresh his memory about the location of the inputs and outputs on the icon. LabVIEW has a "help" feature which displays in another window the icon connection diagram: the icon with short wires attached to each input and output and labelled with the name of the associated front panel control or indicator. (Note: in many CAD systems a user can define a new block with labelled inputs and outputs which the system can subsequently display, however, the block is defined by itself, not in association with a front panel). For example, the connection diagram of FIG. 5a would be displayed for the front panel of FIG. 5b.

VI FUNCTION PALETTES

Figure 6A:
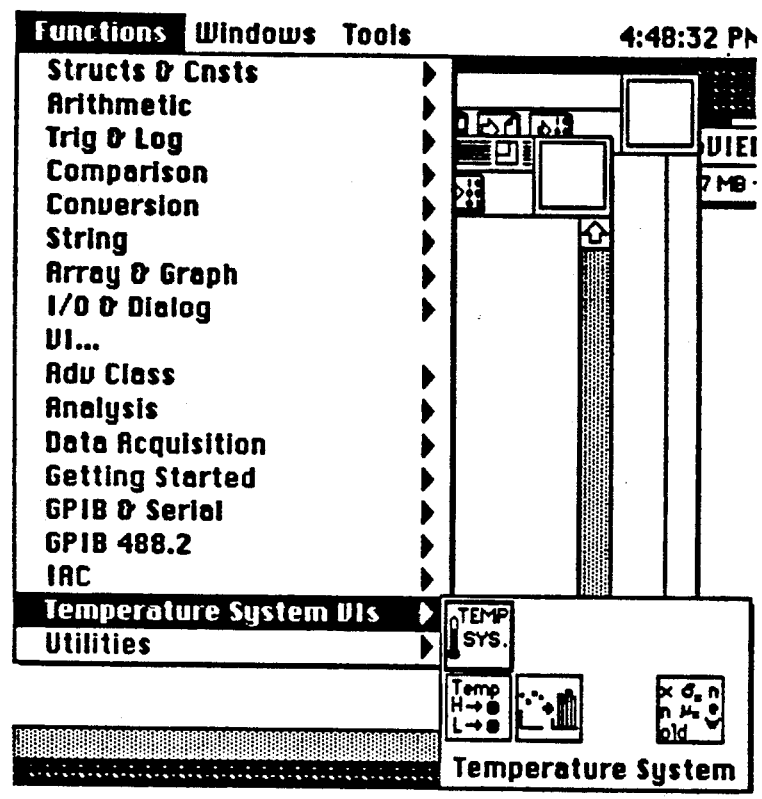
Figure 6B:
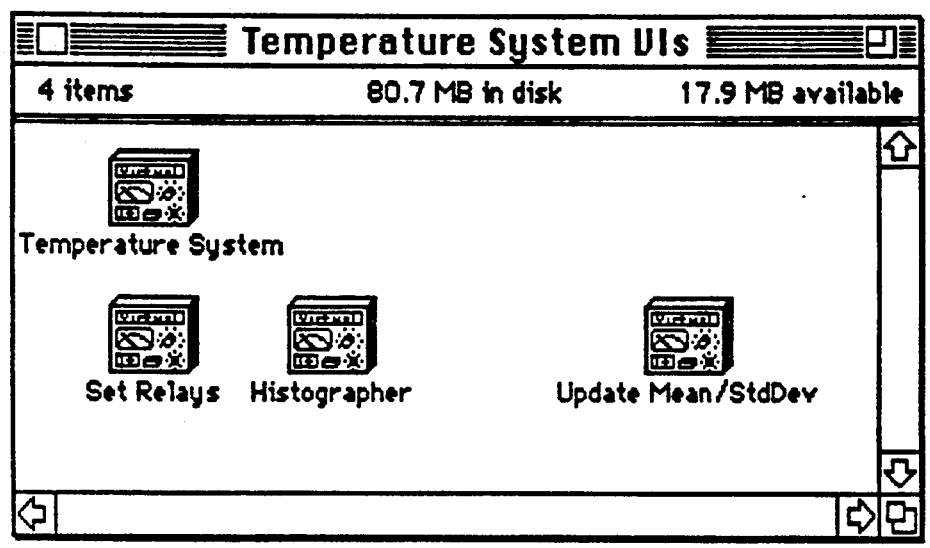
FIG. 6b shows a representative display of a two-dimensional function palette.

LabVIEW users create VIs which can be used as building blocks in other VIs. Many of the VIs are of a general nature, e.g., "utilities", and are used commonly. To facilitate location of these VIs the user can place them in a vi.lib subfolder as shown in FIG. 6B. After doing this LabVIEW will automatically create a palette menu (a 2-D pictorial representation of the collection of VIs) and display this palette on command from the user as shown in FIG. 6A (by command-clicking to get a pop-up menu and moving the mouse to the name of his folder which automatically appears in the menu).

HIERARCHY DIAGRAM

Figure 7:
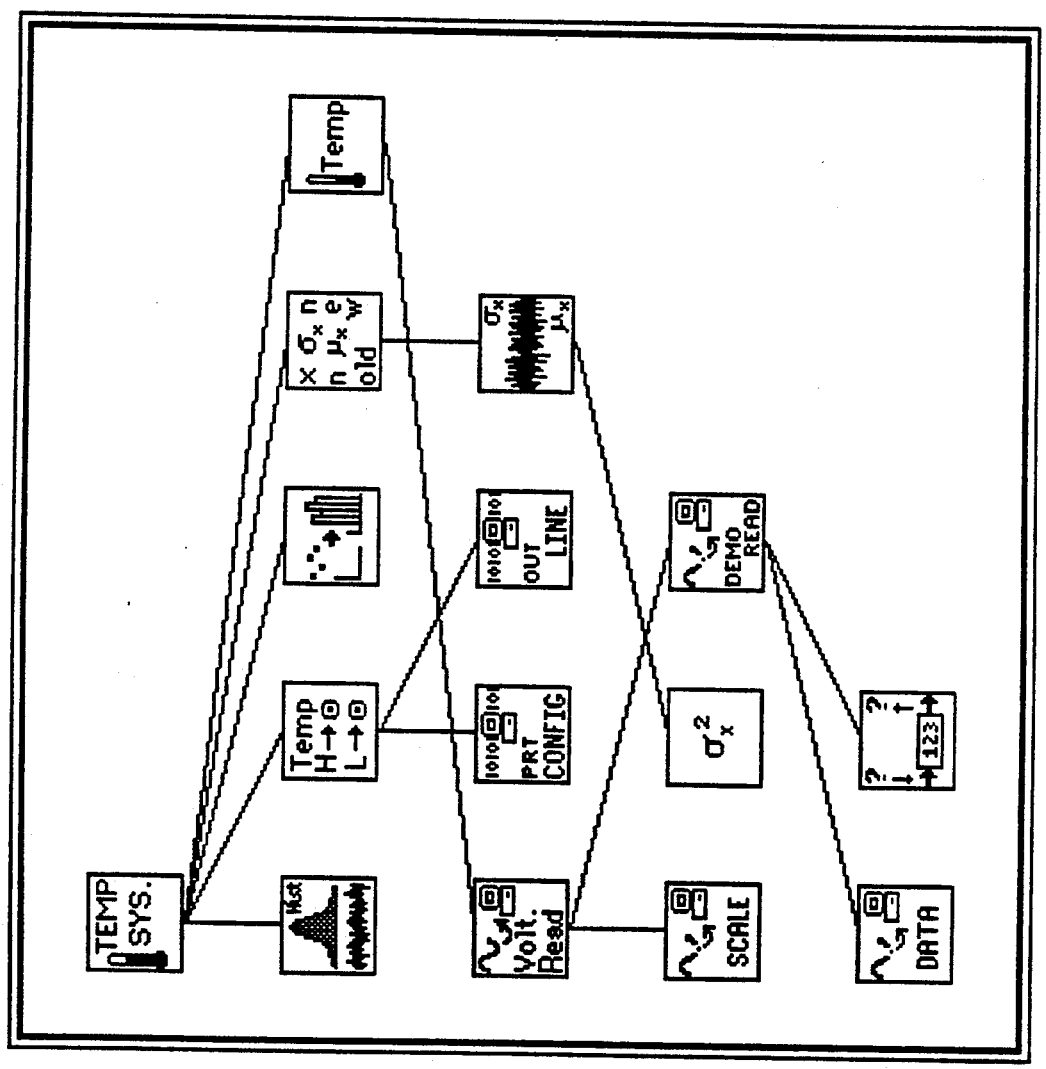
FIG. 7 shows an illustrative hierarchy diagram.
Figure 8A:
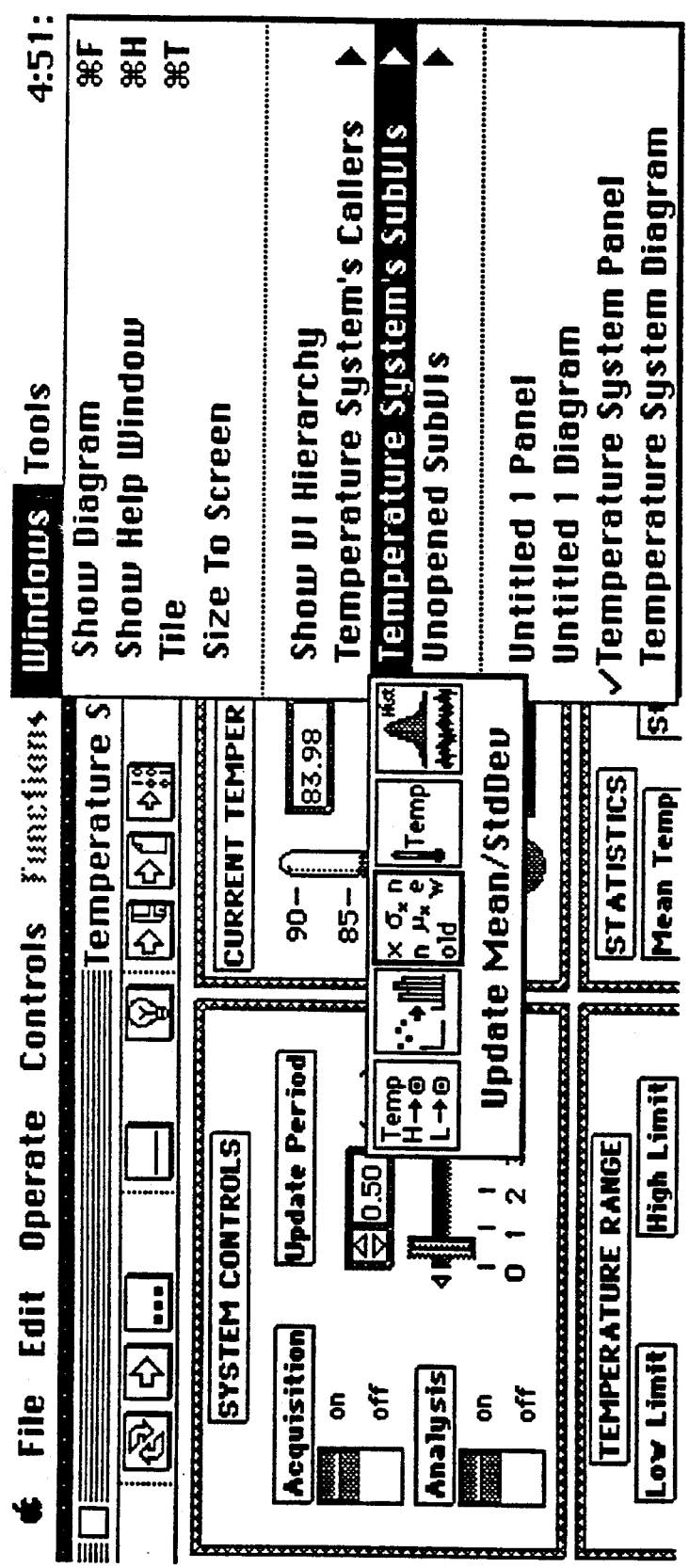
FIG. 8a is an illustrative screen display showing a representative temperature system's SubVIs containing five SubVI icons.
Figure 8B:
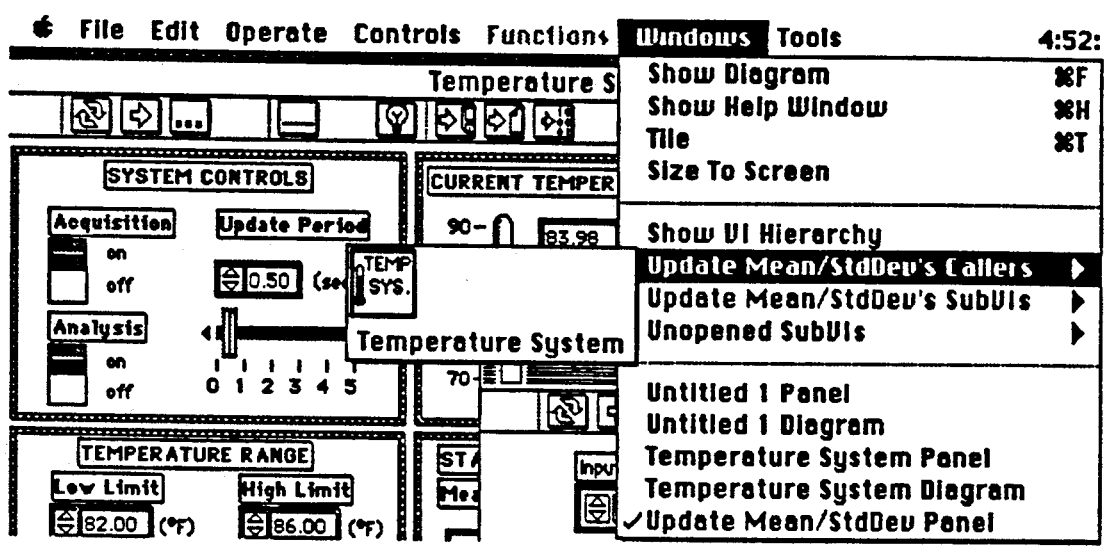
Figure 9:
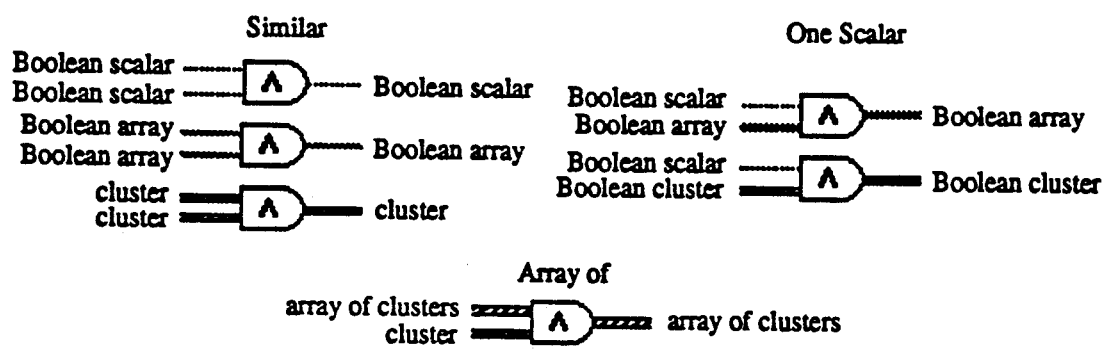
FIG. 9 is an illustrative diagram showing different input/output line representations connected to an AND function icon.
Figure 10:
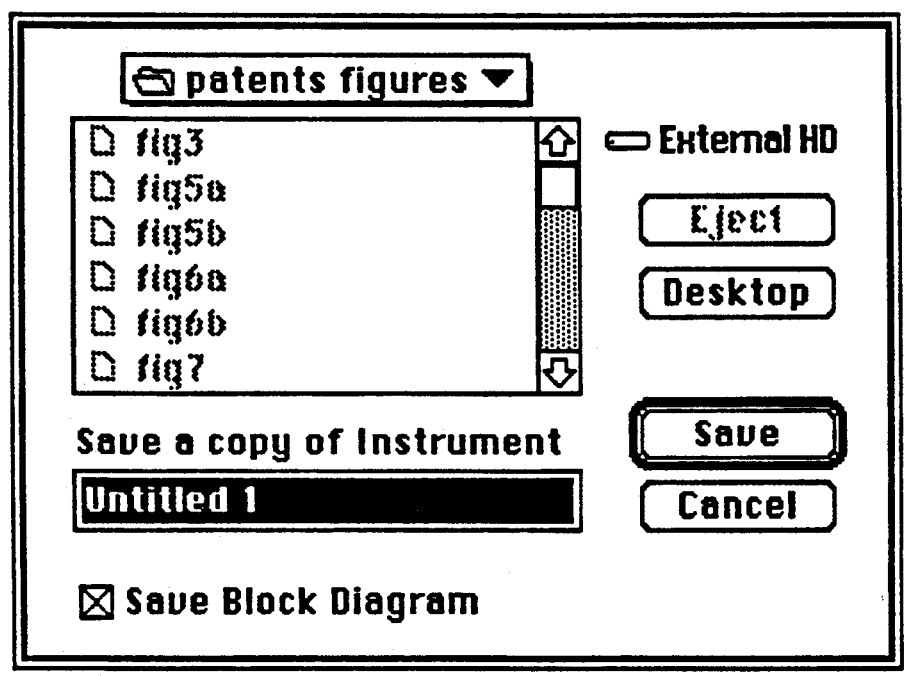
FIG. 10 is a representative dialog box for the Save Block Diagram option.

LabVIEW users create VIs which can be used as building blocks in other VIs. VIs are analogous to subroutines (rather than macros) so it is useful to display the hierarchical relationship of VIs. LabVIEW automatically constructs a diagram showing the hierarchy of all VIs in memory. FIG. 7 shows an illustrative diagram. The hierarchy diagram shows each VI icon exactly once and each icon has lines to all the other icons that it directly uses in its block diagram. The icons are arranged in rows with the higher level VI icons higher on the screen than the lower level icons and the interconnecting lines between adjacent rows. There is no substantial difference if the icons are arranged in columns with higher level icons to the left and lower level to the right and interconnecting lines between adjacent columns. Similarly, the arrangement could be inverted: bottom to top, or right to left. LabVIEW also displays in a palette the direct users of a VI and in another palette the VI icons directly used by the VI. (note: programs exist which determine and display the hierarchy of subroutines in a text-based program; they don't exist for dataflow programs because the dataflow languages use macros for modularization rather than true hierarchical encapsulation; a hierarchy diagram is typically less useful for macros).

Figure 5B:
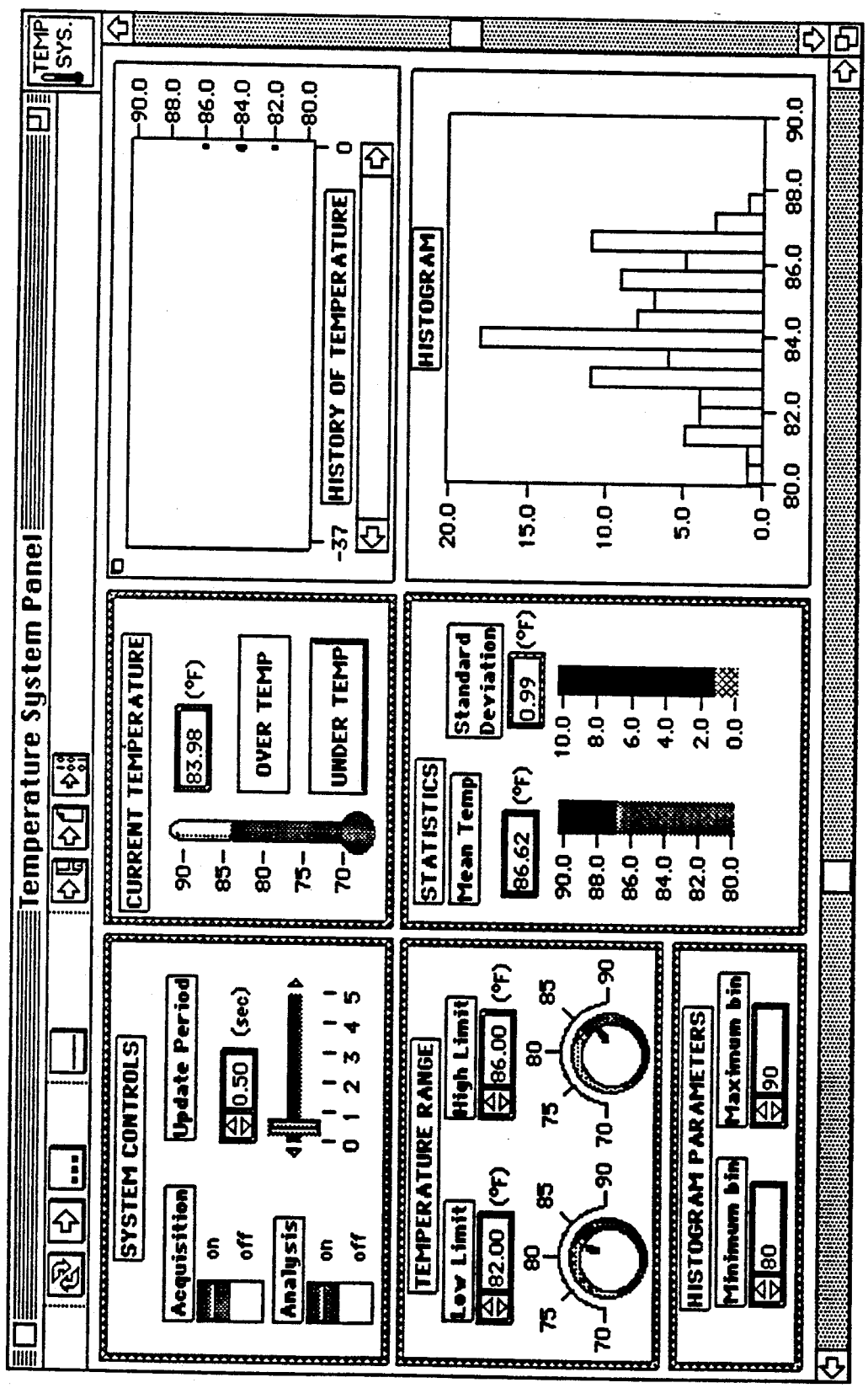

TEMPERATURE SYSTEM CONNECTION DIAGRAM (FIG. 5a) AND ASSOCIATED FRONT PANEL (FIG. 5b)

This temperature acquisition and analysis demo shows a strip chart of the acquired temperature (simulated data). The user sets high and low limits for the temperature, which are also shown on the strip chart, and which activate warning messages when the temperature goes out of those limits. The current mean and standard deviation of the temperature are displayed; and a histogram of the temperature is shown as a bar graph. The histogram parameters may be adjusted. The user may choose to enable the acquisition and analysis processes independently, and may set the update rate for the displays. The default values work well for a demonstration.

CONSTANTS

There are many situations where a constant is needed instead of a front panel control. A constant behaves like a front panel control as far as the computational aspects but it is not changeable from the front panel so there is a measure of security with respect to its value. Constants can come in all the same types available for front panel controls. In LabVIEW there are two ways to produce constants: 1) create a front panel control, set its value, and then hide it so only the terminal appears on the block diagram; 2) place a control directly on the diagram rather than on the front panel.

RUNTIME SYSTEM

A LabVIEW user may design a set of VIs for use by another person not skilled in the construction of VIs, but only skilled in the operation of VIs from the front panel. To protect the VIs from inadvertent modification LabVIEW has a option to save a VI without its block diagram which prevents it from being modified. When running a collection of VIs thus protected a lot of memory can be saved by using a version of LabVIEW that does not include any editing capability, just front panel operation capability. This reduced system is called the runtime or run-only system.

ARITHMETIC FUNCTIONS

Figure 4:
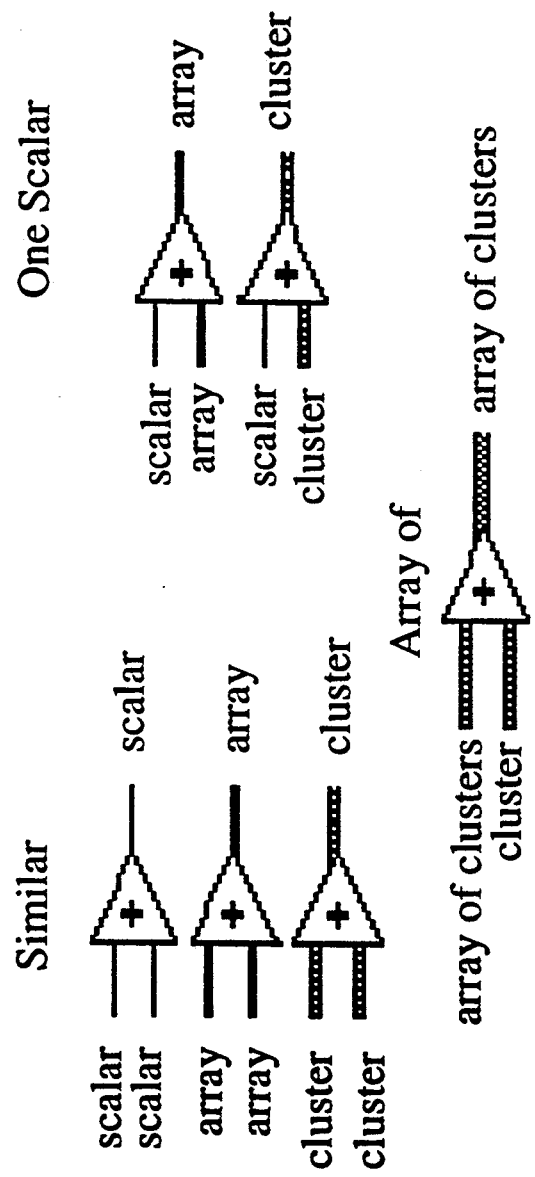
FIG. 4 is an illustrative diagram showing a representative variety of inputs and outputs provided to an arithmatic function.

Referring to FIG. 4, for similar inputs, a function is performed on the respective elements of the structures. For example, two arrays can be added element by element. Both arrays should have the same dimensionality and, for predictable results, should have the same dimension size and number of elements. Also, both clusters should have the same number of elements and the respective elements should have the same structures.

For operations involving a scalar and an array or a scalar and a cluster, the function is performed on the scalar and the respective elements of the structure. For example, a number can be subtracted from all elements of an array, regardless of the dimension of the array.

For operations that involve a numeric type and an array of that type, the function is performed on each array element. For example, to offset a graph, which is an array of points (a point being a cluster of two numeric types x and y) by 5 units in the x direction and 8 units in the y direction, you can add a point (5,8) to the graph.

FIG. 4 illustrates some possible polymorphic combinations of the Add (+) function (FIG. 4 Polymorphic Add function).

POLYMORPHISM—ARITHMETIC FUNCTIONS

These functions take numeric input data. With some exceptions noted in the function descriptions, the output has the same numeric representation as the input or, if the inputs have different representations, the wider of the inputs.

The arithmetic functions work on numbers, arrays of numbers, clusters of numbers, arrays of clusters of numbers, and so on. A formal and recursive definition of the allowable input type is:

numeric type=numeric scalar || array [numeric type] || cluster [numeric types]

except that arrays of arrays are not allowed.

Arrays can have any number of dimensions and any size. Clusters can have any number of elements. The output type is the same structure as the input type and the function's operation is done on each element of the structure, for functions with one input.

For functions with two inputs, there are three allowable input combinations:

Similar—both inputs have the same structure and the output has the same structure.

One Scalar—one input is a numeric scalar, the other is an array or cluster, and the output is an array or cluster.

Array of—one input is an array of some numeric type, the other is that numeric type, and the output is an array.

Figure 12:
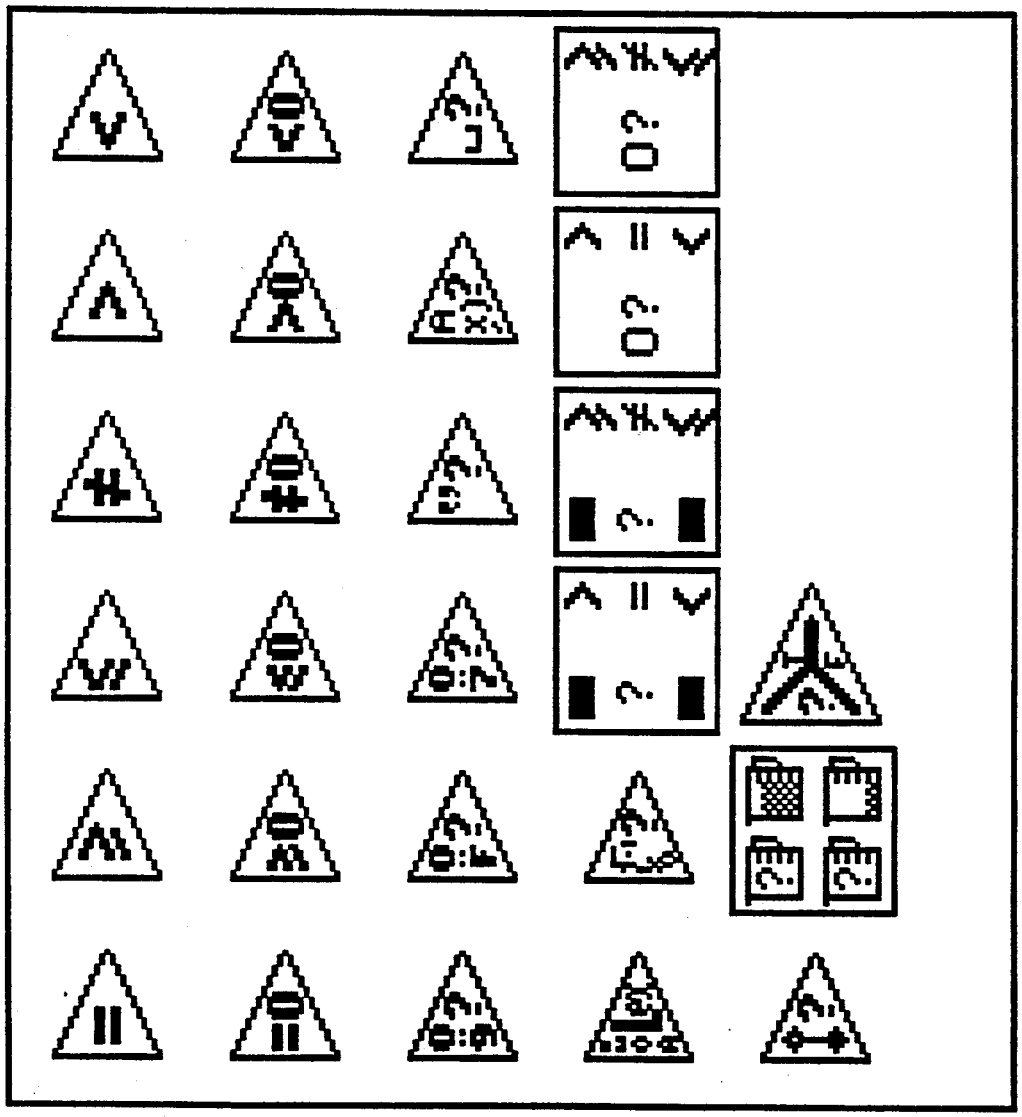
FIG. 12 shows an illustrative screen display of a comparison function pallette.

The illustration in FIG. 12 shows the Comparison function palette, which is accessed by selecting Comparison from the Functions menu.—[all these are polymorphic with respect to numeric type as well as structurally polymorphic (i.e., arrays and clusters allowed]

Figure 11:
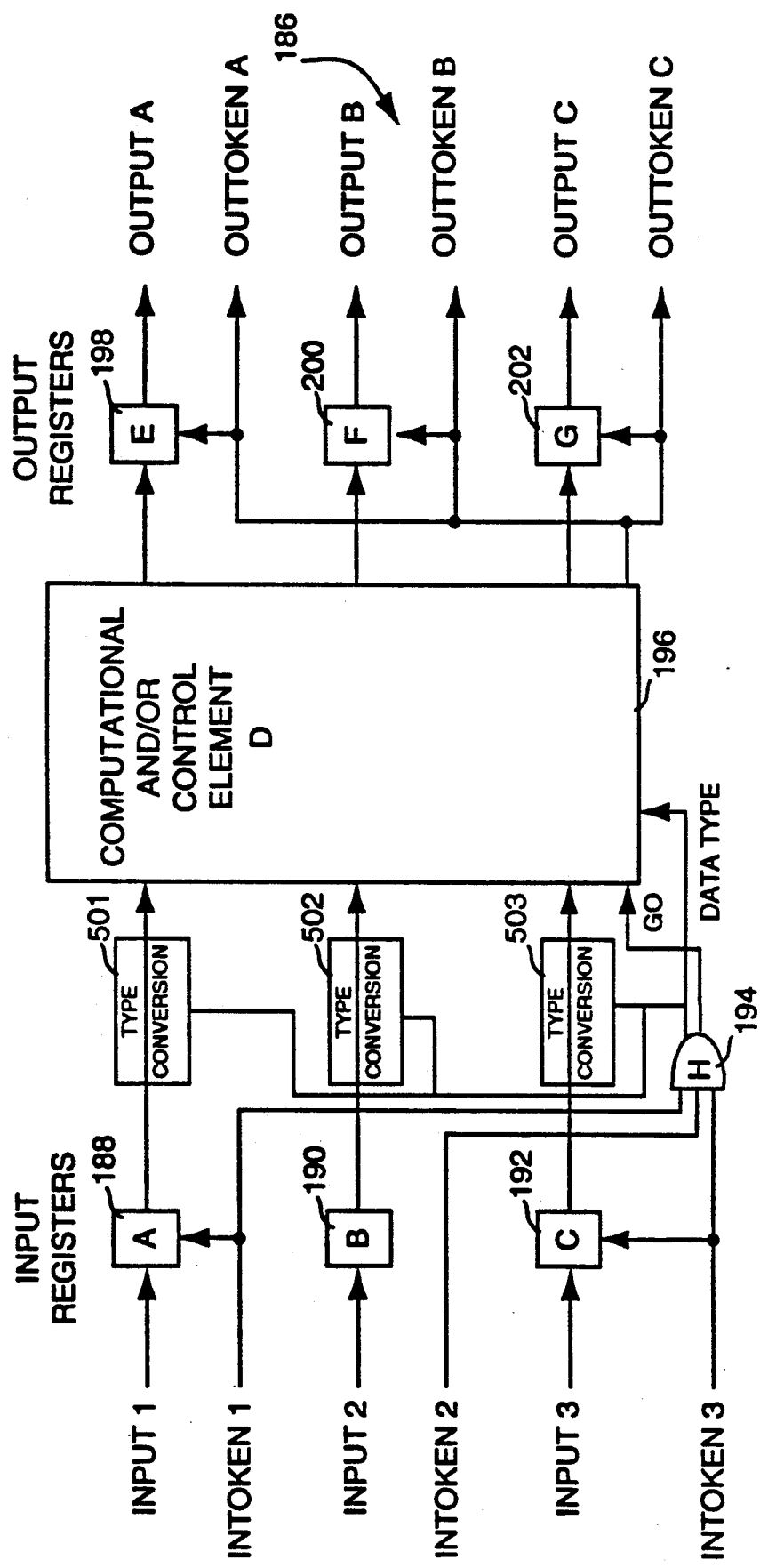
FIG. 11 shows an illustrative functional block diagram in accordance with the present invention which includes type conversion elements.

Referring to FIG. 11, based on the analysis of the data types of the respective inputs, item 194 determines the data type for the computation and/or control element 196. This type is used by the type conversion element 501 to transform this input to the required data type for that specific input to the computation element 196, from the data type of the corresponding input 188. This same process is performed for each input: type conversion 502 for input 2, and type conversion 503 for input 3, etc. If the data type in the corresponding input register is the same as the required data type, the value is passed from the input register to the computation element directly (i.e., no conversion is needed). Type conversion element 501 performs the specific conversion as required for the first input to computation element 196; the data type requirements for the computation element 196 are determined by the polymorphic analysis, but the resulting inputs may be different.

Figure 11A:
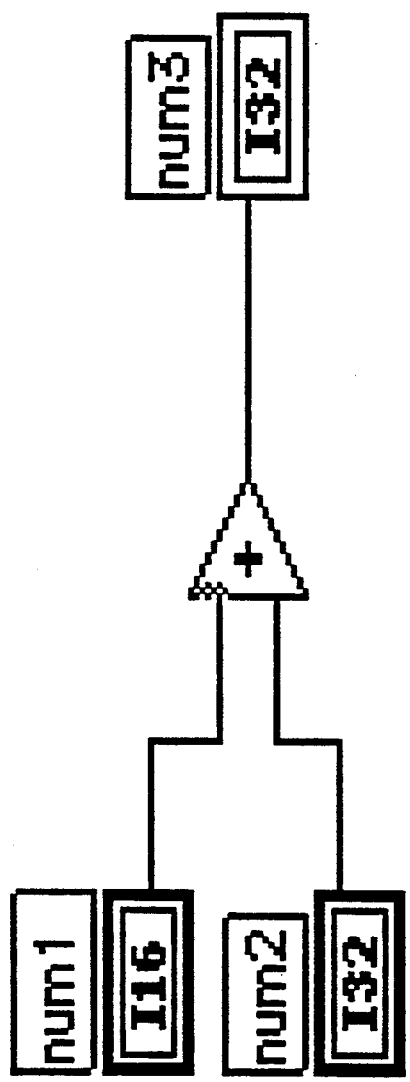
FIG. 11a shows an illustrative functional block diagram which includes an ADD function element.
Figure 11B:
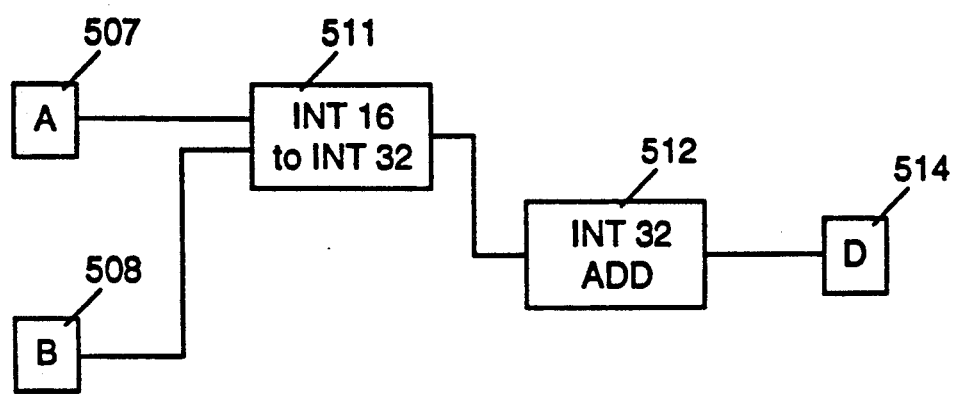

FIG. 11a shows the use of an ADD icon 510 with inputs 504, 505 and 506. The polymorphic analysis determines that the output 513 will be of data type INT32, and that the first input 504 needs to be converted from INT16 to INT32. FIG. 11b shows the actual processing performed by the computation element.

Figure 11C:
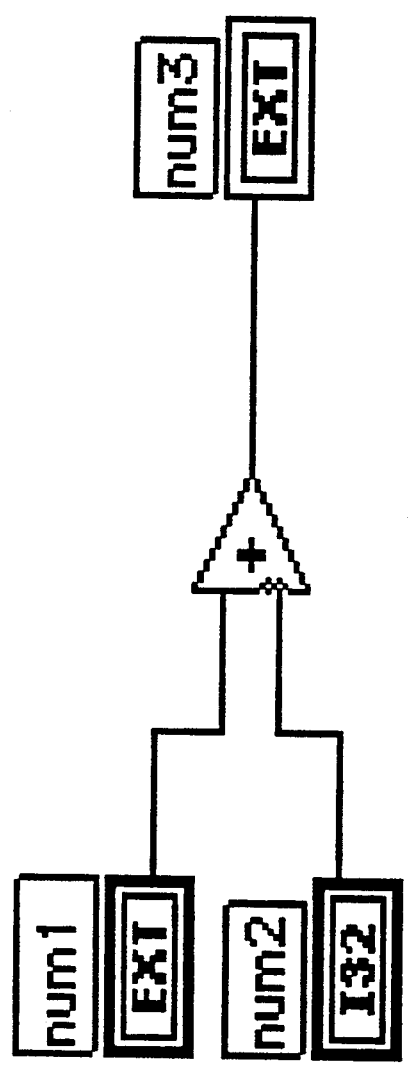
FIG. 11c shows an illustrative functional block diagram which includes an ADD function element.
Figure 11D:
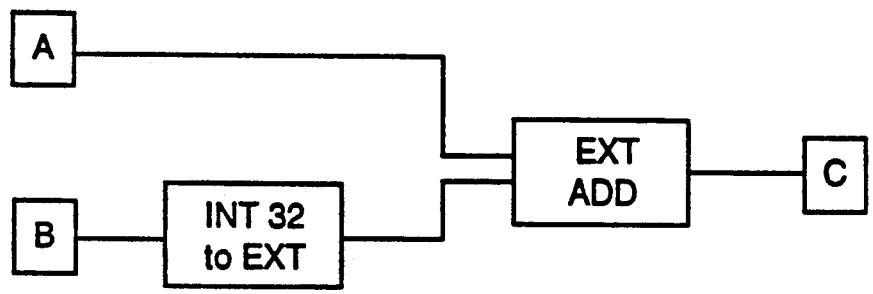
FIG. 11d shows an illustrative functional block diagram which shows further details of the function performed by the elements of the diagram of FIG. 11c.

FIG. 11c shows the use of the exact same icon used in FIG. 11a, with inputs of data types EXT and INT32. FIG. 11d indicates the processing resulting from the polymorphic analysis of FIG. 11c. Note further that the polymorphic analysis can be performed for functions with a variable number of inputs, such as the ADD icon used in FIG. 11a and 11c.

POLYMORPHISM

These functions take numeric input data. If the input is an integer, the output is an extended precision float. Otherwise, the output has the same floating point representation as the input.

Figure 13:
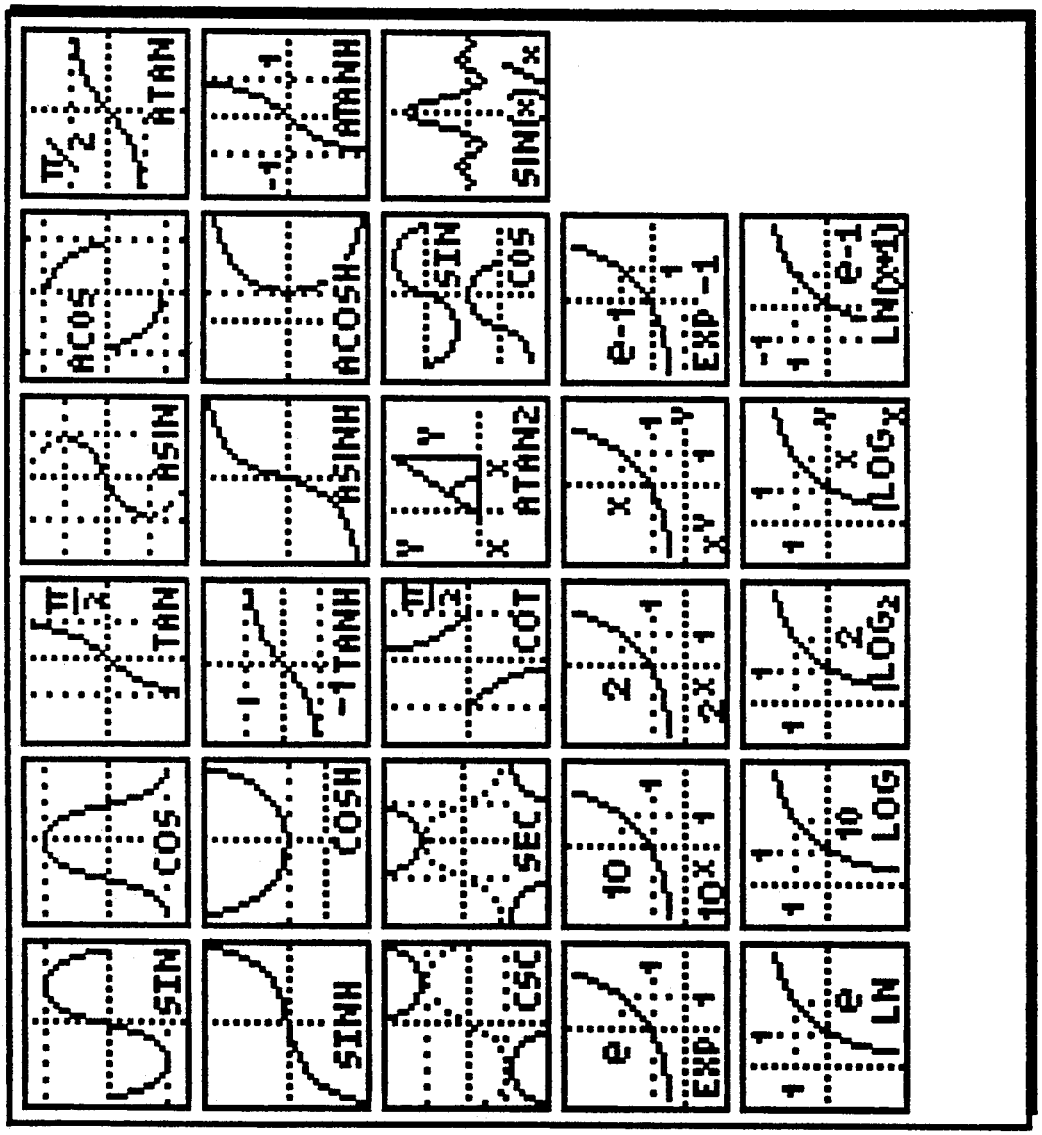
FIG. 13 shows an illustrative screen display of a trigonometric and logarithmic function palette.

The illustration in FIG. 13 shows the Trigonometric and Logarithmic function palette, which you access by selecting Trig & Log from the Functions menu. The trig and log functions work on numbers, arrays of numbers, clusters of numbers, arrays of clusters of numbers, and so on. A formal and recursive definition of the allowable input type is:

```
numeric type=numeric scalar || array[numeric
   type] || cluster [numeric types]
``` except that arrays of arrays are not allowed.

Arrays can be of any size and have any number of dimensions. Clusters can have any number of elements. The output type is the same structure as the input and the function's operation is done on each element of the structure.

POLYMORPHISM FOR STRING FUNCTIONS

Figure 14:
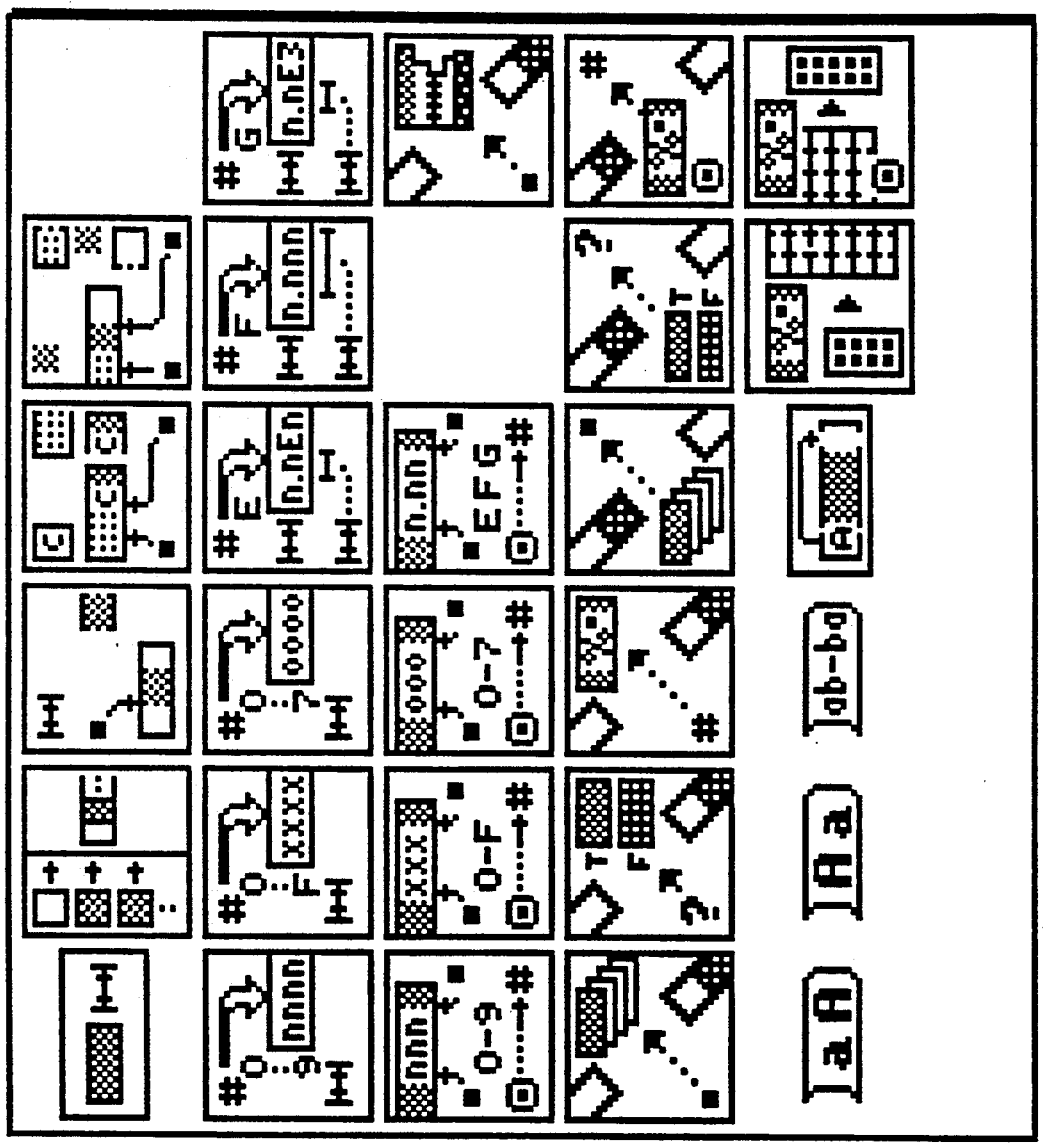
FIG. 14 shows an illustrative screen display of a string function palette.

The illustration of FIG. 14 shows the String function palette, which you access by selecting String from the Functions menu.

String Length, To Upper Case, To Lower Case, Reverse String, and Rotate String accept strings, clusters, arrays of strings, and so on. To Upper Case and To Lower Case also accept numbers, interpreting them as ASCII codes for characters. From Decimal, From Hex, From Octal, and From Exponential/Fract/Sci accept clusters and arrays of numbers and produce clusters and arrays of strings. Width and precision inputs must be scalar.

STRING FUNCTION DESCRIPTIONS

Figure 15:
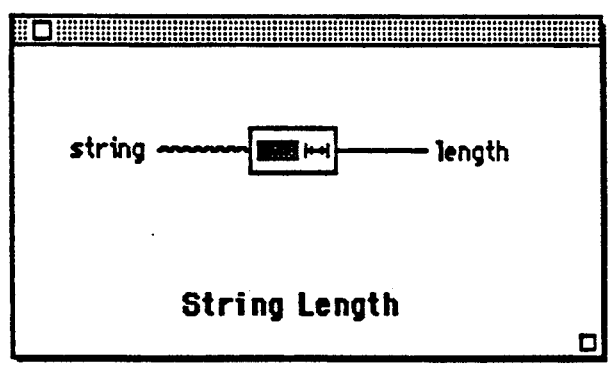
FIG. 15 shows a representation of a string length function.

Referring to FIG. 15, the String Length function returns in length the number of characters (bytes) in String. Input can be a scalar, n dimensional array, or cluster. The output will have the same structure, but the type is long integer.

Figure 16:
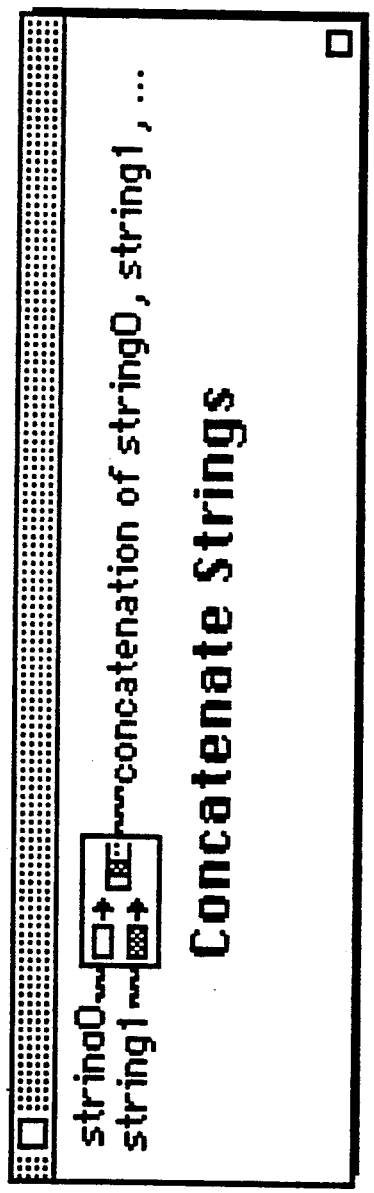
FIG. 16 shows a representation of a concatenate string function.

Referring to FIG. 16, the Concatenate Strings function concatenates all the input strings into a single output string. This is an expandable function; the default icon/connector has two input terminals, but you can add as many input terminals as you need with Add Element from the function pop-up menu, or by resizing the function with the positioning tool. Strings are concatenated from top to bottom as wired to the node.

Figure 17:
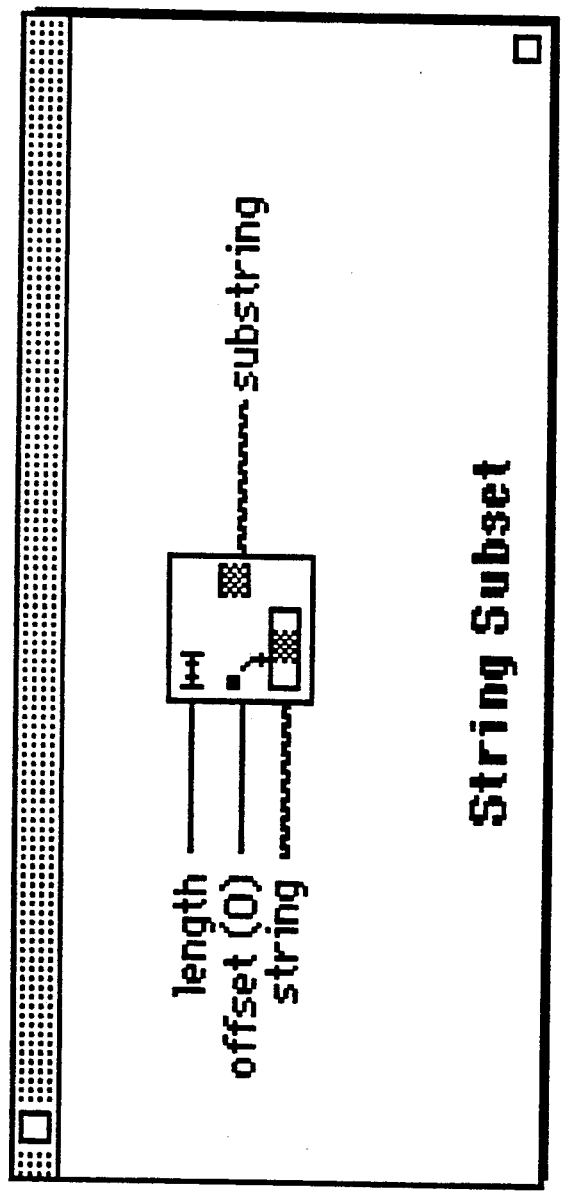
FIG. 17 shows a representation of a string subset function.

Referring to FIG. 17, the String Subset function returns the substring of the original string beginning at offset and containing length number of characters. The offset of the first character in the string is 0, and if offset is left unwired or less than 0, it is set to 0. If offset is greater than the length of string or if length is less than 0, then substring is empty. If length is greater than the length of string minus offset, then substring equals string.

GENERAL BEHAVIOR OF CONVERSION FUNCTIONS

Figure 18:
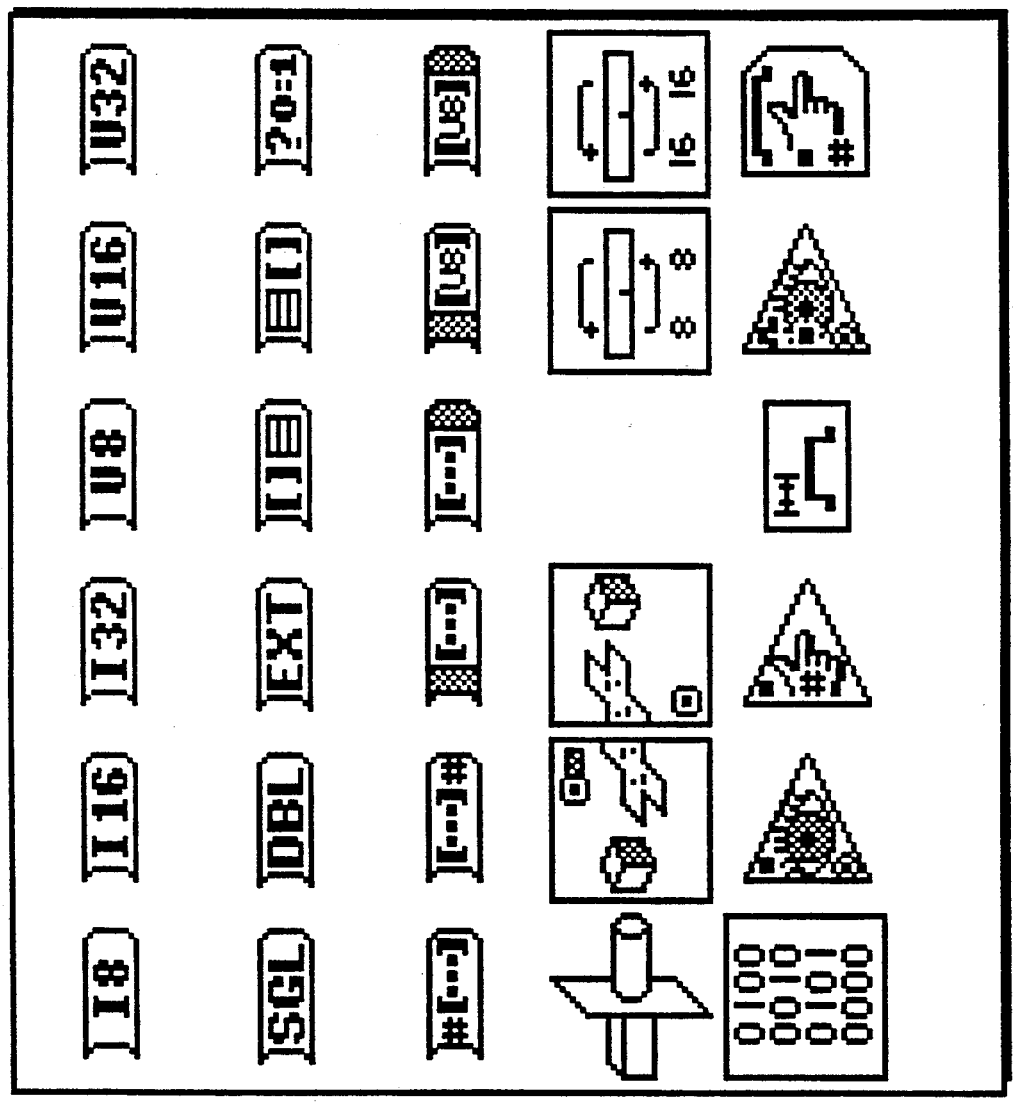
FIG. 18 shows a representation of a conversion function palette.

The illustration of FIG. 18 shows the Conversion function palette, which you access by selecting Conversion from the Functions menu.

The functions To Byte Integer, To Word Integer, To Long Integer, To Unsigned Byte Integer, To Unsigned Word Integer, To Unsigned Long Integer, To Single Precision Float, To Double Precision, and To Extended Precision Float convert a numeric input to the specific representation. These functions work on numeric scalars, arrays of numbers, clusters of numbers, arrays of clusters of numbers, and so on. The output is the same structure as the input but with the new numeric representation.

When floating point numbers are converted to integers, they are rounded to the nearest integer. A fractional part of 0.5 is rounded to the nearest even integer. If the result is out of range for the integer, then the minimum or maximum value is returned. When integers are converted to smaller integers, the least significant bits are copied with no overflow checking. When they are converted to larger integers, they are sign-extended if signed or zero-padded if unsigned.

POLYMORPHISM FOR ARRAY AND GRAPH FUNCTIONS

Figure 19:
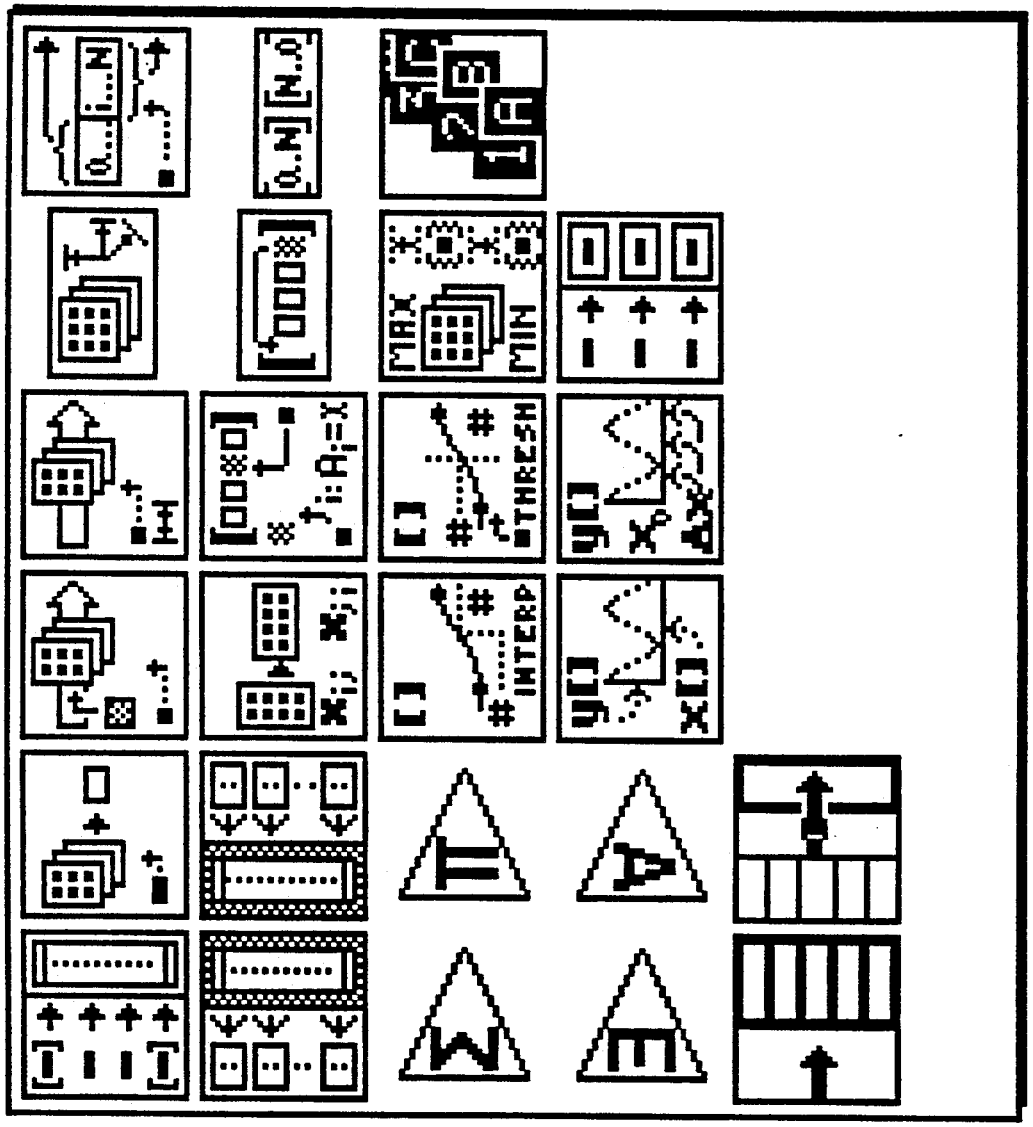
FIG. 19 shows a representation of an array and graph function palette.
Figure 20:
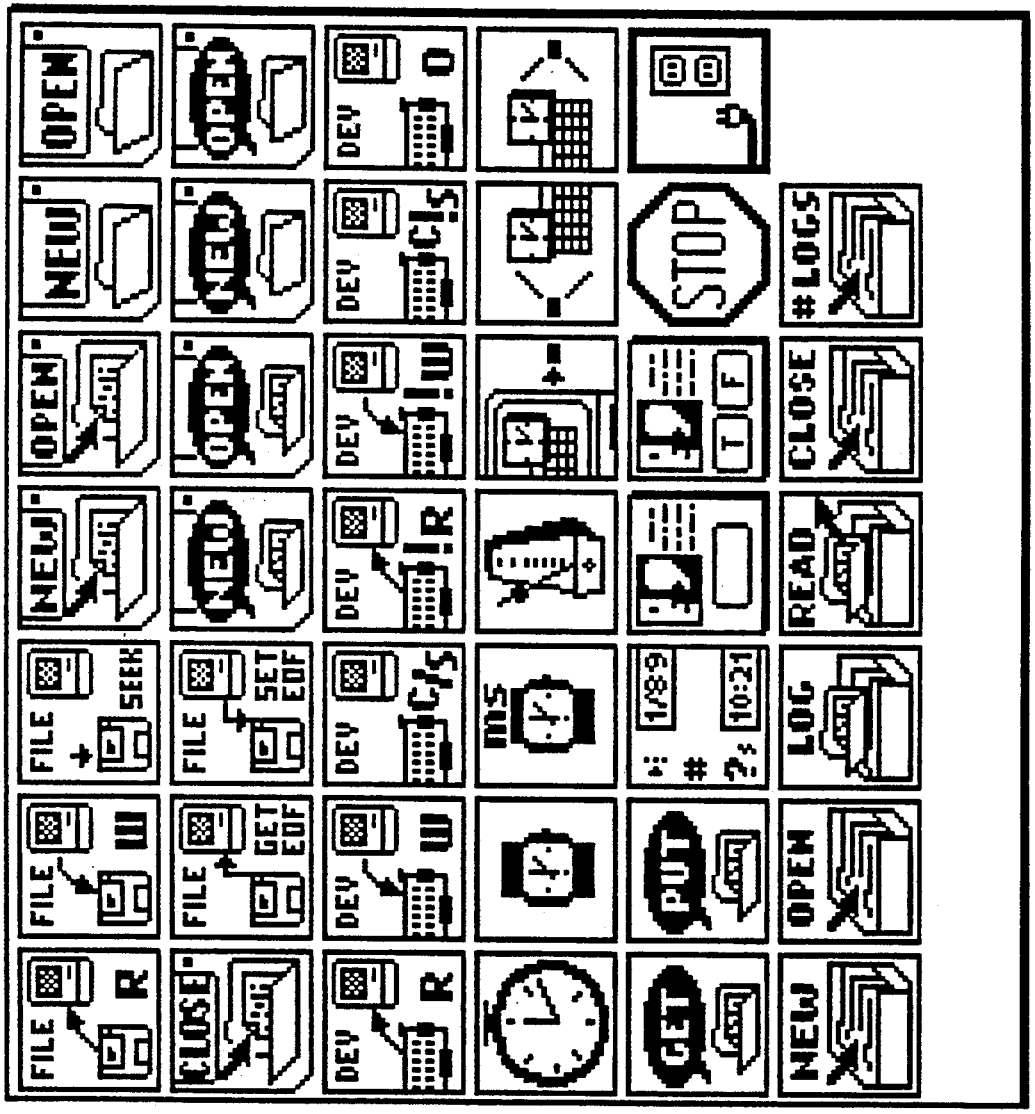
FIG. 20 shows a representation of an I/O Dialog function palette.

The illustration of FIG. 19 shows the Array and Graph function palette, which you access by selecting Array and Graph from the Functions menu. Referring to FIG. 20, the two nonshaded functions in the third row and the four nonshaded functions in the sixth row are polymorphic with respect to date type. They are: device control, device status, new file, open file, log to file and read file.

EXPLORING A BLOCK DIAGRAM

Figure 21:
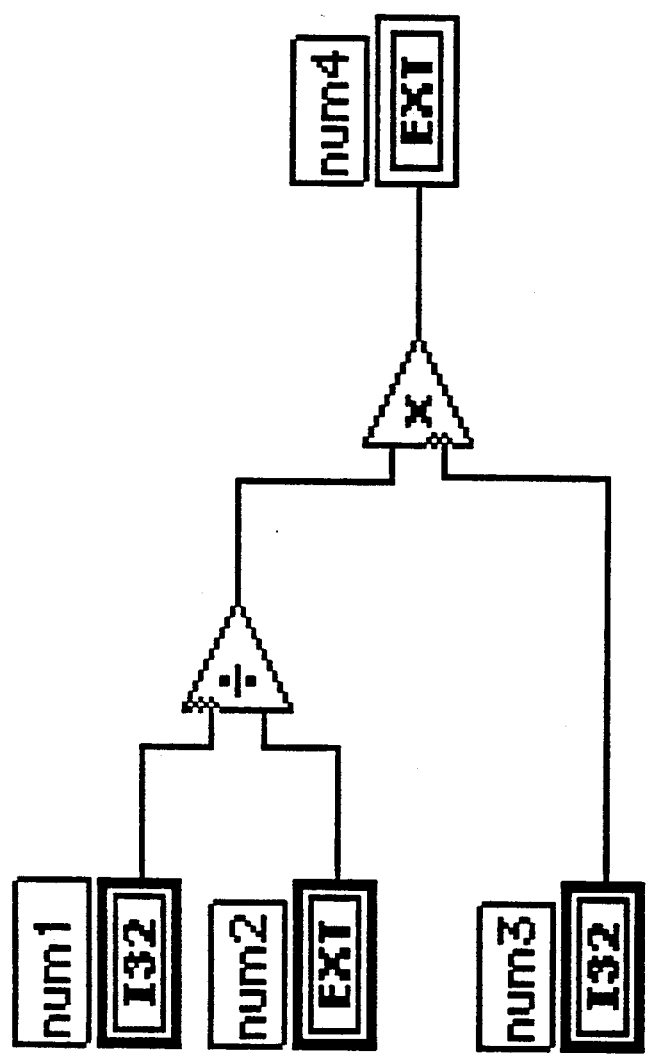

In FIG. 21, the multiply/divide functions produce floating point outputs because one of their inputs is floating point. Since the other input is integer, it is automatically converted to floating point as part of the operation of the icon. The "gray" pattern at the junction of the integer input and the icon informs the user of the automatic conversion.

What is claimed is:

1. In a computer system having a central processing unit, a memory for storing programs and data, and a display; a dataflow programming subsystem, comprising:

a library of function icons, each representing a mathematical operation to be performed on specified input data to generate output data; wherein a first multiplicity of said function icons are polymorphic with respect to numeric representation, and wherein a second multiplicity of said function icons, comprising a subset of said first multiplicity of function icons, are structurally polymorphic with respect to data aggregation;

dataflow diagram generating means for interconnecting a specified plurality of said function icons, and for connecting specified ones of said plurality of function icons to specified input data sources that provide respective input data having a respective specified numeric representation and data structure, to generate a dataflow diagram representing mathematical operations to be performed on said input data so as to generate output data;

said dataflow diagram generating means including polymorphic interpreting means for assigning, prior to execution of said dataflow diagram, specific mathematical operations with respect to numeric representation and data structure to each function icon in said dataflow diagram in accordance with numeric representation and data structure of the input data to said each function icon, such that:

(A) each function icon in said dataflow diagram that is polymorphic with respect to numeric representation is assigned an integer mathematical operation when all input data for said each function icon are integers;

(B) each function icon in said dataflow diagram that is polymorphic with respect to data aggregation is assigned, when said input data to said each function icon in said dataflow diagram comprises arrays of input data, a mathematical operation to be performed on an element by element basis so as to generate an array of output data; and (C) each function icon in said dataflow diagram that is polymorphic with respect to data aggregation is assigned, when said input data to said each function icon comprises a scalar value and an array of input data, a mathematical operation to be performed on each element of said array of input data in conjunction with said scalar value so as to generate an array of output data; and dataflow diagram executing means for executing said dataflow diagram by performing said specific mathematical operations assigned to said plurality of icons in said dataflow diagram;

front panel generating means for generating a front panel that is displayed on said computer system's display, said front panel having controls that generate control values to be used as said input data for specified ones of said function icons in said dataflow diagram; and said dataflow diagram executing means including means for displaying said front panel and for receiving user commands specifying the control values to be generated by said front panel during execution of said dataflow diagram.

2. The dataflow programming subsystem of claim 1, said polymorphic interpreting means including means for assigning specific mathematical operations with respect to numeric representation and data structure to each function icon in said dataflow diagram in accordance with the specified numeric representation and data structure of the input data to said each function icon, such that (D) each function icon in said dataflow diagram that is polymorphic with respect to data aggregation is assigned, when said input data to said each function icon in said dataflow diagram comprises clusters of input data, a mathematical operation to be performed on a component by component basis so as to generate a cluster of output data; and (E) each function icon in said dataflow diagram that is polymorphic with respect to data aggregation is assigned, when said input data to said each function icon comprises a scalar value and a cluster of input data, a mathematical operation to be performed on each component of said cluster of input data in conjunction with said scalar value so as to generate a cluster of output data.

3. The dataflow programming subsystem of claim 1, said front panel generating means including means for hiding a specified one of said front panels controls so as make the control value generated by said specified one front panel control a constant.

4. The dataflow programming subsystem of claim 1, said dataflow diagram generating means including means for locking said dataflow diagram so as to prevent modification thereof without preventing said dataflow diagram executing means from executing said dataflow diagram.

5. In a computer system having a central processing unit, a memory for storing programs and data, and a display; a dataflow programming subsystem, comprising:

a library of function icons, each representing a mathematical operation to be performed on specified input data to generate output data; wherein a first multiplicity of said function icons are polymorphic with respect to numeric representation, and wherein a second multiplicity of said function icons, comprising a subset of said first multiplicity of function icons, are structurally polymorphic with respect to data aggregation;

virtual instrument generating means for generating and storing a multiplicity of virtual instruments, each virtual instrument including a respective dataflow diagram representing mathematical operations to be performed on specified input data to generate specified output data, and each of a subset of said virtual instruments including a respective virtual front panel having controls that generate control values to be used as input data to the dataflow diagram of one of said subset of virtual instruments;

said virtual instrument generating means including:
    dataflow diagram generating means for interconnecting specified ones of said function icons and said virtual instruments, and for connecting specified ones of said plurality of function icons and virtual instruments to specified input data sources that provide respective input data having a respective specified numeric representation and data structure, to generate said dataflow diagram for any specified one of said multiplicity of virtual instruments; said generated dataflow diagram representing mathematical operations to be performed on said respective input data so as to generate respective output data; and
    front panel generating means for generating a respective front panel for any specified one of said multiplicity of virtual instruments, said respective front panel having controls responsive to user commands that generate control values to be used as said input data for a respective one of said dataflow diagrams; and virtual instrument executing means for executing the respective dataflow diagram for a specified one of said multiplicity of virtual instruments by displaying said respective front panel, if any, for said specified one virtual instrument, receiving user commands specifying said control values to be generated by said front panel during execution of said respective dataflow diagram, and performing said mathematical operations represented by said dataflow diagram using said generated control values as input data.

6. The dataflow programming subsystem of claim 5, said virtual instrument generating means including;
   icon means for assigning an icon to each generated virtual instrument, and
   palette displaying means for displaying on said computer system's display a two dimensional palette of said assigned icons and for responding to user selection of one of said displayed icons in said two dimensional palette by selecting the virtual instrument corresponding to said selected icon.

7. The dataflow programming subsystem of claim 6, said computer system including pointer means for displaying a moveable cursor over images displayed on said computer system's display;
   said virtual instrument generating means including naming means for assigning a name to each generated virtual instrument;
   said palette displaying means including means, responsive to movement of said moveable cursor to a position proximate any one of said displayed icons, for displaying said assigned name of the virtual instrument computer corresponding to said icon to which moveable cursor is proximate.

8. The dataflow programming subsystem of claim 5, said virtual instrument generating means including icon means for assigning an icon to each generated virtual instrument, palette displaying means for displaying on said computer system's display a two dimensional palette of said assigned icons, and hierarchy display means for displaying a hierarchy diagram in which, for a selected virtual instrument, there are displayed (A) the assigned icon of said selected virtual instrument, (B) the assigned icons of virtual instruments included in said selected virtual instrument's dataflow diagram, and (C) the assigned icons of virtual instruments included in the dataflow diagrams of said included virtual instruments.

9. The dataflow programming subsystem of claim 5, said virtual instrument generating means including icon means for assigning an icon to each generated virtual instrument, and hierarchy display means for displaying a hierarchy diagram in which, for a selected virtual instrument, there are displayed (A) the assigned icon of said selected virtual instrument, (B) the assigned icons of virtual instruments included in selected virtual instrument's dataflow diagram, (C) the assigned icons of virtual instruments included in the dataflow diagrams of said included virtual instruments, and (D) lines connecting each displayed icon to the displayed icons of the virtual instruments included in the virtual instrument dataflow diagram corresponding to said each displayed icon.

10. The dataflow programming subsystem of claim 5, said virtual instrument generating means including icon means for assigning an icon to each generated virtual instrument, and sub-instrument display means for displaying (A) the assigned icon of a selected virtual instrument, and (B) the assigned icons of virtual instruments included in said selected virtual instrument's dataflow diagram.

11. The dataflow programming subsystem of claim 5, said virtual instrument generating means including icon means for assigning an icon to each generated virtual instrument, and user display means for displaying (A) the assigned icon of a selected virtual instrument, and (B) the assigned icons of all virtual instruments in which said selected virtual instrument is included in such virtual instruments' dataflow diagram.

12. The dataflow programming subsystem of claim 5, said front panel generating means including means for hiding a specified one of said front panels controls so as to make the control value generated by said specified one front panel control a constant.

13. The dataflow programming subsystem of claim 5, said dataflow diagram generating means including means for locking said dataflow diagram so as to prevent modification thereof without preventing said dataflow diagram executing means from executing said dataflow diagram.

14. The dataflow programming subsystem of claim 5, said dataflow diagram generating means including polymorphic interpreting means for assigning, prior to execution of said dataflow diagram, specific mathematical operations with respect to numeric representation and data structure to each function icon in said dataflow diagram in accordance with numeric representation and data structure of the input data to each function icon, such that:
   (A) each function icon in said dataflow diagram that is polymorphic with respect to numeric representation is assigned an integer mathematical operation when all input data for said each function icon are integers;
   (B) each function icon in said dataflow diagram that is polymorphic with respect to data aggregation is assigned, when said input data to said each function icon in said dataflow diagram comprises arrays of input data, a mathematical operation to be performed on an element by element basis so as to generate an array of output data; and
   (C) each function icon in said dataflow diagram that is polymorphic with respect to data aggregation is assigned, when said input data to said each function icon comprises a scalar value and an array of input data, a mathematical operation to be performed on each element of said array of input data in conjunction with said scalar value so as to generate an array of output data; and
   dataflow diagram executing means for executing said dataflow diagram by performing said specific mathematical operations assigned to said plurality of function icons in said dataflow diagram.

15. The dataflow programming subsystem of claim 14, said polymorphic interpreting means including means for assigning specific mathematical operations with respect to numeric representation and data structure to each function icon in said dataflow diagram in accordance with numeric representation and data structure of the input data to said each function icon, such that
   (D) each function icon in said dataflow diagram that is polymorphic with respect to data aggregation is assigned, when said input data to each said function icon in said dataflow diagram comprises clusters of input data, a mathematical operation to be performed on a component by component basis so as to generate a cluster of output data; and
   (E) each function icon in said dataflow diagram that is polymorphic with respect to data aggregation is assigned, when said input data to said each function icon comprises a scalar value and a cluster of input data, a mathematical operation to be performed on each component of said cluster of input data in conjunction with said scalar value so as to generate a cluster of output data.

* * * * *